Jan. 30, 1940.                    T. E. SMITH                    2,188,447
            KEYWAY AND GEAR CUTTING ATTACHMENT FOR LATHES
                       Filed July 22, 1938            3 Sheets-Sheet 1
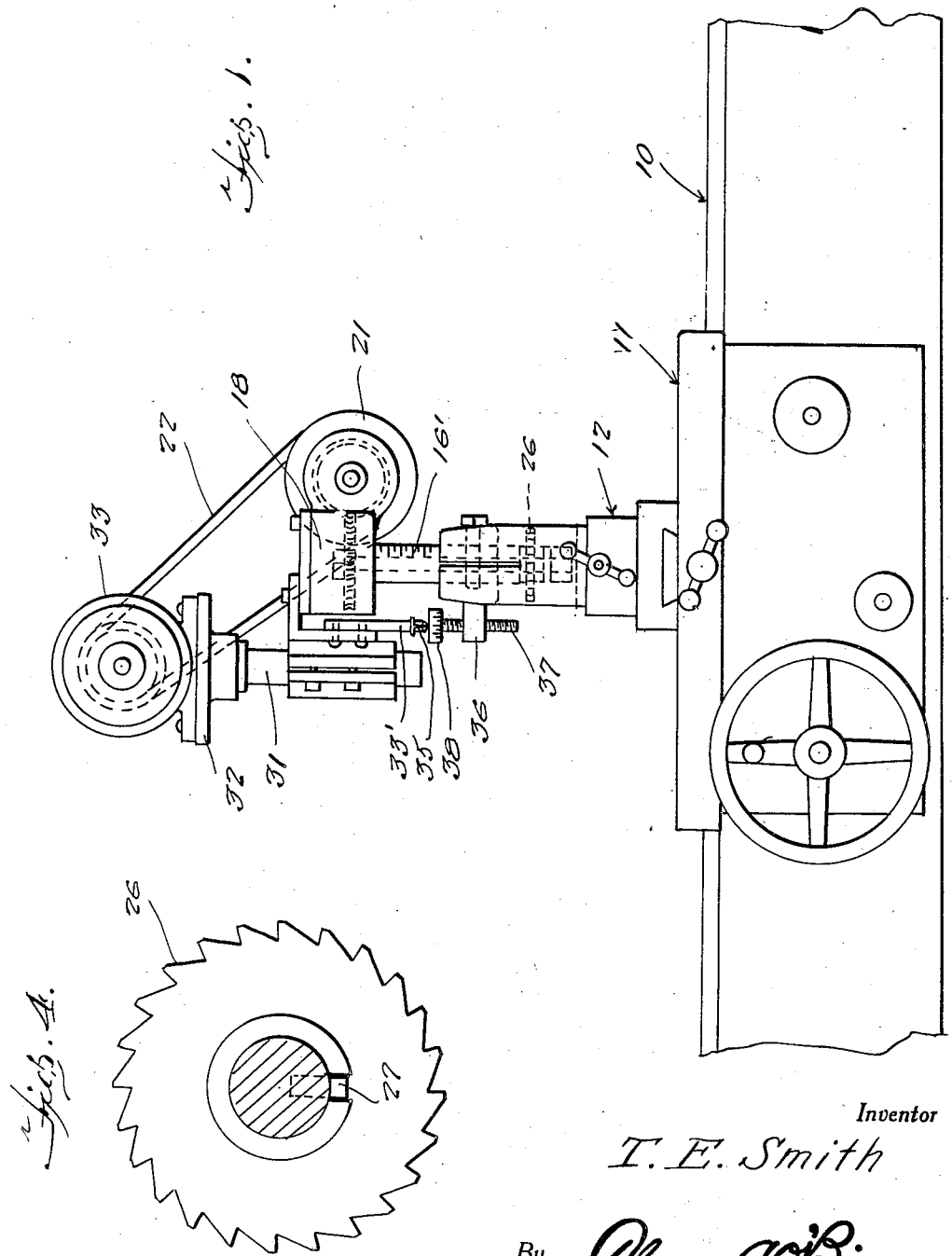
Inventor
T. E. Smith
By Clarence A. O'Brien
and Hyman Berman
Attorneys

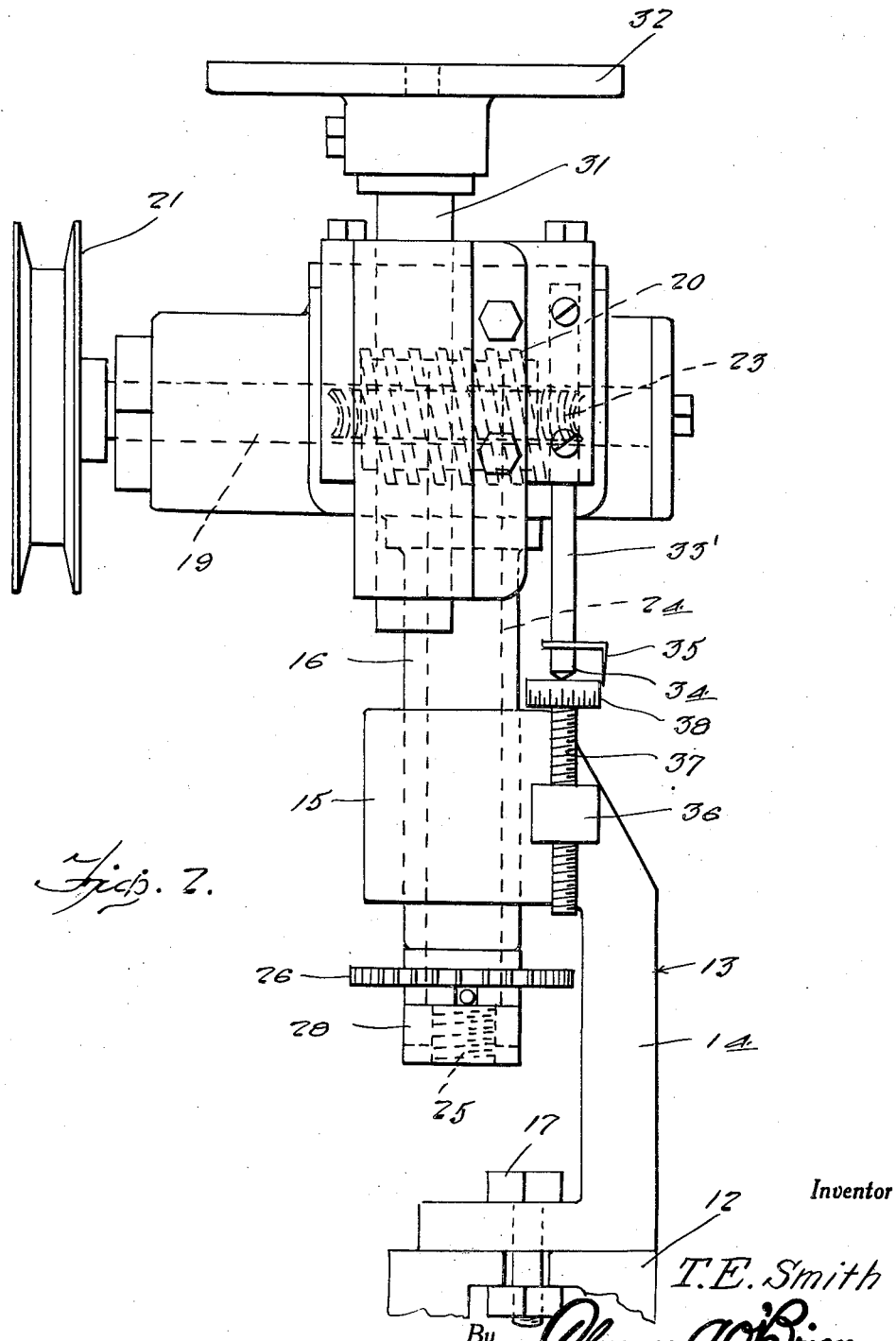

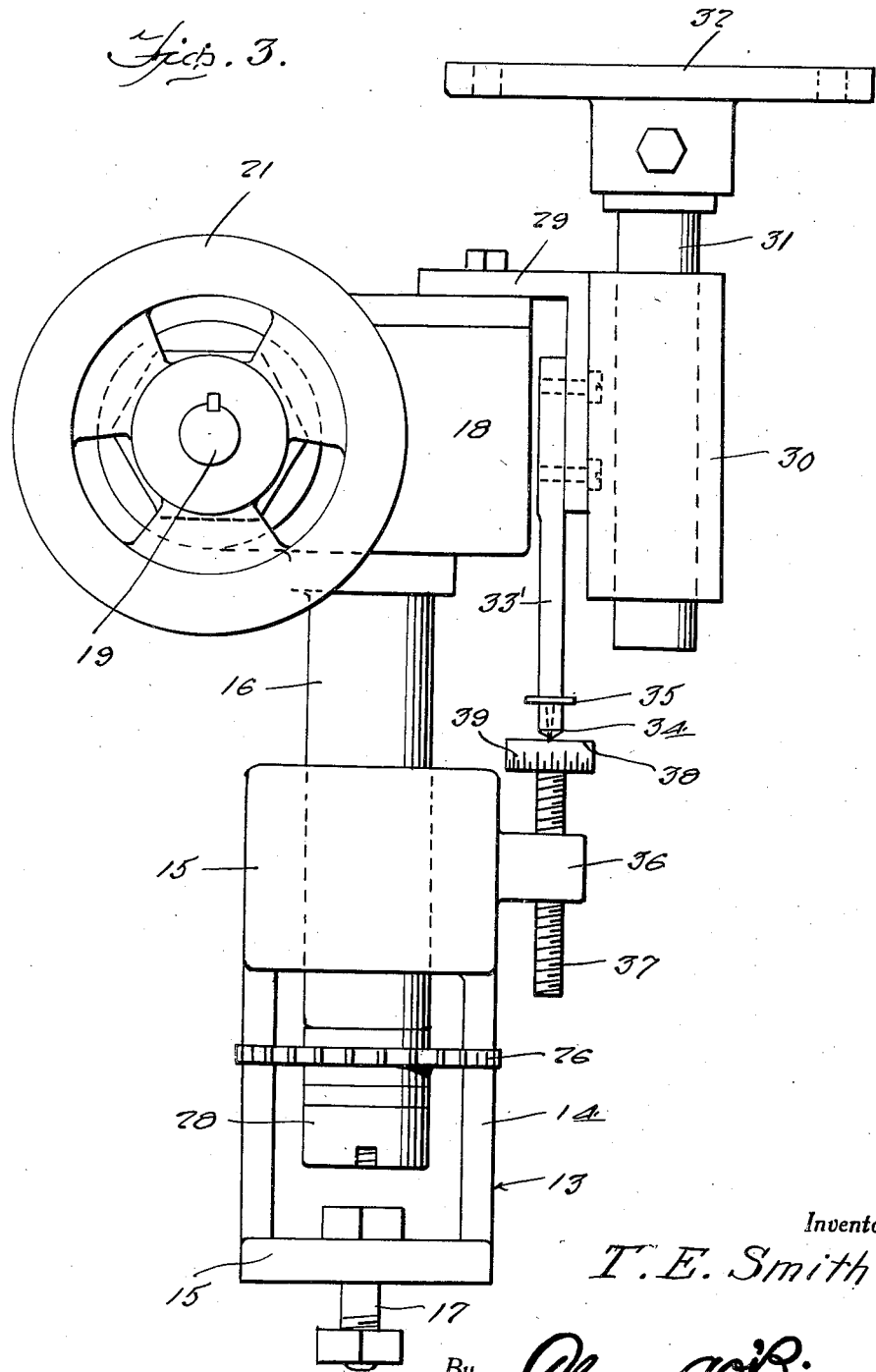

Patented Jan. 30, 1940

2,188,447

UNITED STATES PATENT OFFICE 2,188,447

KEYWAY AND GEAR CUTTING ATTACHMENT FOR LATHES

Thomas E. Smith, Akron, Ohio, assignor of one-half to Edward Dorn, Girard, Ohio

Application July 22, 1938, Serial No. 220,781

2 Claims. (Cl. 90—15)

This invention relates to keyway and gear cutting attachments for lathes, and has for the primary object the provision of a portable power driven device of this character which may be readily attached to a tool post holder of any lathe of a conventional construction, whereby the lathe and almost all of the usual equipment thereon may be operated or used without interference from the attachment and in conjunction therewith if desired, that is, the work to be cut by the present attachment may be supported and fed by the lathe, the attachment being easily adjusted relative to the work for varying the cut made therein, so that keyways or splines may be cut with minute accuracy or if desired, gears may be cut by using on the attachment gear cutters.

With these and other objects in view, the invention consists in certain novel features of construction, combination and arrangement of parts to be hereinafter more fully described and claimed.

For a complete understanding of my invention, reference is to be had to the following description and accompanying drawings, in which:

Figure 1 is a fragmentary elevational view showing a portion of a lathe and a tool post holder thereof with the present attachment mounted thereon.

Figure 2 is a side elevation illustrating the attachment.

Figure 3 is a front elevation illustrating the attachment.

Figure 4 is a plan view, partly in section, illustrating the cutter of the attachment.

Referring in detail to the drawings, the numeral 10 indicates a fragmentary portion of a lathe showing thereon a carriage 11 on which is mounted the usual tool post holder 12 on which is attached the present invention for the purpose of cutting splines, keyways or the like in work carried by the lathe in the usual manner, or if desired, the present device may be successfully employed for cutting gears from stock carried by the lathe through the use of gear cutters (not shown).

A substantially U-shaped bracket 13 includes a vertically arranged connecting portion 14 and superimposed parallel portions 15, one of which slidably supports a tubular post 16 and the other is apertured to receive a bolt or like fastener 17 for mounting the bracket on the tool post holder 12. The post 16 forms an integral part of a gear housing 18 and depends therefrom. The gear housing 18 rotatably supports a worm shaft 19, the worm being indicated by the character 20. One end of the shaft extends outwardly of the gear housing 18 and has secured thereon a belt pulley 21 to permit connecting of the shaft 19 to a power source through the use of an endless belt 22. The worm 20 meshes with a worm gear 23 secured on the upper end of a cutter shaft 24 journaled in the tubular post 16 and is equipped with a reduced screw threaded lower end 25 for mounting on the tool shaft 24 a rotatable cutter 26 of the type shown in Figure 4 or gear cutters or other similar cutting tools of the well known construction and (not shown). The cutter is keyed onto the cutter shaft 24, as shown at 27, and a nut 28 is employed for removably securing the cutter on the cutter shaft by being threaded on the reduced screw threaded end 25. It is to be understood that the upper end of the cutter shaft 24 is arranged in the gear housing 18 with the worm gear 23 in mesh with the worm 20.

An L-shaped bracket 29 is mounted on the top wall of the gear housing 18 with a portion depending downwardly and spaced from one side of said gear housing and has secured thereon a split type bearing 30 in which is adjustably mounted a post 31 carrying at its upper end a table 32 on which an electric motor 33 is mounted. The electric motor is connected to the pulley 21 by the belt 22. By releasing the split bearing 30 the post 31 may be adjusted vertically for the purpose of tensioning the belt.

A bar 33' is secured on the depending portion of the L-shaped bracket 29 and is provided with a pointed lower end 34 and also mounted on the lower portion of the bar 33' is an indicator 35. A screw threaded ear 36 is formed on the bracket 13 and is located directly under the bar 33'. A micrometer screw 37 is threaded in the ear 36 and carries at its upper end a disc-like finger piece 38 arranged in contact with the pointed end 34 of the bar 33' and is provided with a scale 39 on the periphery thereof. The indicator 35 coacts with the scale 39 in permitting the operator to get a minute adjustment of the cutter with respect to the work. By rotating the finger piece in opposite directions, the tubular post 16 will be caused to slide upwardly and downwardly in the portion 15 of the bracket 13, consequently adjusting the cutter with respect to the work so that extremely accurate cutting of splines, keyways and the like in work can be easily accomplished.

The spacing and alignment of cuts made in the work can be easily accomplished without much skill on the part of the operator through use of the means or devices already provided on the lathe. The work is mounted between centers of the lathe and the feed is by hand along the travel of the carriage. A device of the character described and shown in the drawings will be durable, compact and efficient and may be manufactured and sold at a low cost.

The post 16 may be provided with a scale indicated at 16' to aid in the vertical adjustment of the post.

It is believed that the foregoing description when taken in connection with the drawings will fully set forth the construction and advantages of this invention to those skilled in the art to which such a device relates, so that further detailed description will not be required.

Having thus described my invention, what I claim is:

1. An attachment for lathes comprising a vertically arranged tubular post, a substantially U-shaped bracket slidably supporting said post and including means for the detachable securing thereof on a tool post holder of a lathe, a cutter shaft journaled in said post and carrying a cutter, a gear housing carried by said post, a second shaft journaled in the gear housing, meshing worm and worm gears connecting said shafts and arranged in the gear housing, a second bracket mounted on the gear housing and including a depending portion, a bar secured to the depending portion of the second bracket and having a pointed lower end provided with an indicator, a screw threaded ear formed on the first-named bracket and arranged under and in alignment with the bar, a micrometer screw threaded in said ear and including a disc-like finger piece providing a bearing for the pointed end of said bar and provided with a scale on the periphery thereof for cooperation with the indicator whereby a person may minutely adjust the post vertically in the first-named bracket, and means for rotating the second-named shaft.

2. An attachment for lathes comprising a vertically arranged tubular post, a substantially U-shaped bracket slidably supporting said post and including means for the detachable securing thereof on a tool post holder of a lathe, a cutter shaft journaled in said post and carrying a cutter, a gear housing carried by said post, a second shaft journaled in the gear housing, meshing worm and worm gears connecting said shafts and arranged in the gear housing, a second bracket mounted on the gear housing and including a depending portion, a bar secured to the depending portion of the second bracket and having a pointed lower end provided with an indicator, a screw threaded ear formed on the first-named bracket and arranged under and in alignment with the bar, a micrometer screw threaded in said ear and including a disc-like finger piece providing a bearing for the pointed end of said bar and provided with a scale on the periphery thereof for cooperation with the indicator whereby a person may minutely adjust the post vertically in the first-named bracket, a split bearing mounted on the second-named bracket, a post adjustably mounted in said bearing, and a table carried by the second-named post for supporting an electric motor belted to the second-named shaft.

THOS. E. SMITH.